United States Patent

Bossard

[11] Patent Number: 5,983,078
[45] Date of Patent: Nov. 9, 1999

[54] CHANNEL SPACING FOR DISTORTION REDUCTION

[75] Inventor: Bernard Bossard, New York, N.Y.

[73] Assignee: Cellularvision Technology & Telecommunications, LP, Freehold, N.J.

[21] Appl. No.: 08/819,896

[22] Filed: Mar. 18, 1997

[51] Int. Cl.$^6$ .................................................. H04B 7/00
[52] U.S. Cl. .............................. 455/63; 455/8; 455/209; 455/102; 370/343
[58] Field of Search ...................... 455/63, 61, 5.1, 455/6.2, 14, 13.3, 188.1, 188.2, 189.1, 192.1, 194.1, 203, 209–227, 102, 103, 114, 118, 45, 8; 370/319, 343, 344, 485

[56] References Cited

U.S. PATENT DOCUMENTS

| | | | |
|---|---|---|---|
| 3,778,716 | 12/1973 | Stokes | 325/49 |
| 4,287,598 | 9/1981 | Langseth et al. | 455/52 |
| 4,475,242 | 10/1984 | Rafal et al. | 455/3 |
| 4,747,160 | 5/1988 | Bossard | 455/33 |
| 4,940,984 | 7/1990 | Kleiber | 342/173 |
| 4,984,252 | 1/1991 | Morimoto | 455/8 |
| 5,204,686 | 4/1993 | Petrelis et al. | 342/374 |
| 5,274,836 | 12/1993 | Lux | 455/1 |
| 5,287,543 | 2/1994 | Wolkstein | 455/13.3 |
| 5,535,191 | 7/1996 | Park | 455/8 |
| 5,548,799 | 8/1996 | Kobayashi et al. | 455/8 |
| 5,594,937 | 1/1997 | Stiles et al. | 455/5.1 |
| 5,666,646 | 9/1997 | McCollum et al. | 455/8 |
| 5,812,605 | 9/1998 | Smith et al. | 455/103 |
| 5,818,813 | 10/1998 | Saito et al. | 370/344 |

FOREIGN PATENT DOCUMENTS

WO8807800  10/1988  WIPO.

*Primary Examiner*—Curtis A. Kuntz
*Assistant Examiner*—Binh K. Tieu
*Attorney, Agent, or Firm*—David R. Treacy

[57] ABSTRACT

Distortion or noise in detected signals, due to intermodular distortion in transmitting sets which transmit multiple channels simultaneously via the same element or component, is reduced by selecting carrier frequencies such that they are not all spaced by the same given frequency. In one embodiment, a first group of channels have one spacing, and an adjacent group have the same spacing but with carrier frequencies offset from a multiple of the spacing used in the first group. In another embodiment, the carrier frequencies of adjacent channels are unequally spaced. Two adjacent blocks of channels may use the same, or different, patterns of unequal spacing.

26 Claims, 5 Drawing Sheets

CHANNEL SPACING FOR DISTORTION REDUCTION

CROSS-REFERENCE TO RELATED APPLICATIONS

This application is a further improvement over the application for DUAL TRANSMITTER ARRANGEMENT WITH BACK-UP SWITCHING filed by applicant herein and another as Ser. No. 08/684,651 filed on Jul. 22, 1996, and assigned to the assignee of the instant application.

STATEMENT REGARDING FEDERALLY SPONSORED RESEARCH OR DEVELOPMENT

Not Applicable

BACKGROUND OF THE INVENTION

The invention relates to methods and apparatus for transmitting multiple signals over large numbers of channels, where two or more of the channels are affected by or transmitted by a component which produces intermodular distortion from the interaction of the signals of these channels. One kind of such component is a traveling wave tube amplifier which may be used as a transmitter output amplifier carrying many channels of information. However, the invention may also be applicable to any other transmission system transmitting more than one channel with one transmitter, because known active electronic devices all introduce at least some distortion.

A system of this type, which has been operated publicly for many years for transmitting multichannel television as described in U.S. Pat. No. 4,747,160, transmits up to 50 television channels in the 28 GHz band. Two traveling wave tube amplifiers (TWTA's) are used for the transmitter output, one amplifying the channels in the lower half of the band, and the other amplifying the channels in the upper half of the band. Because intermodular distortion in a TWTA is a function of its power level, the TWTA's in this system are normally driven to an output power well below their full rated output. While this system has been operating successfully on a commercial basis, with signal quality that exceeds that of typical cable TV, improvements which will permit greater output power from the TWTA with acceptably low signal distortion or noise in the customer's TV picture are always desirable.

Because it simplifies providing equipment which is user friendly, and such matters of administration as setting standards, historically multi-channel systems in a particular band always space channels for a given class of service equally, usually producing carrier frequencies which have integral, easily remembered numbers. It is typical that this is done despite the need for efficient utilization of available spectrum.

BRIEF SUMMARY OF THE INVENTION

According to the invention, a method of transmitting many signals from a transmitting site, in which two or more channels are simultaneously amplified by or transmitted via a component which produces intermodular distortion, includes selecting carrier frequencies for other channels such that the most troublesome intermodular distortion frequencies are removed from the frequencies in the other channels where they will cause interference; that is, not in the part of the band occupied by the desired other signals. Usually this means that the carrier frequencies of the other channels are removed from the most troublesome intermodular frequencies.

According to a preferred embodiment of the invention, the channels for a first portion of the band are equally spaced from each other and form contiguous adjacent channels. If these channels are amplified in a first TWTA, they produce intermodular distortion frequencies primarily in relatively narrow bands which are spaced from each other by a frequency difference equal to the frequency spacing between their carrier frequencies.

Where such a system is operated in a millimeter wave band above 12 GHz, high quality television signals may be transmitted using wide deviation FM signals. The first portion of the band contains contiguous, adjacent channels mutually spaced by a same given frequency; that is, there are no discontinuities or irregularities in the channel spacing. Applicants herein have discovered that a 3 dB to 4 dB improvement in signal to noise ratio for channels in the second portion of the band can be obtained if the channels in the second portion are offset from the frequencies where the first portion's intermodular distortion products are concentrated. According to this embodiment of the invention, carrier frequencies in the second portion are also spaced from each other by the same given frequency, but are located at carrier frequencies which are not spaced a multiple of the given spacing from the carriers of the first portion, and preferably are approximately midway between those multiples.

According to a second preferred embodiment of the invention, the carrier frequencies of the first portion of the band, which pass through the same intermodular distortion producing component, are spaced unequally from each other. A minimum inter-channel spacing is maintained, so that adjacent channel interference is kept low, while a desired average spacing is maintained so that the available spectrum is well utilized. The optimum pattern of frequency variation may be determined by assuming that all channels have a similar concentration of power in the central quarter to third of the channel (typical for FM TV signals) or measuring and then considering the typical spectra of the different channels. This latter method is particularly applicable if some channels have different types of information signals.

The spacing pattern in the first portion of the band may be optimized to minimize effects of intermodular distortion on the channels of that portion, or to provide relatively evenly distributed intermodular products across the other portion. In such case, a similar patterning of carrier frequencies in the second portion will minimize the overall interference caused in receivers tuned for channels of the first portion.

DETAILED DESCRIPTION OF THE INVENTION

Figure 1:
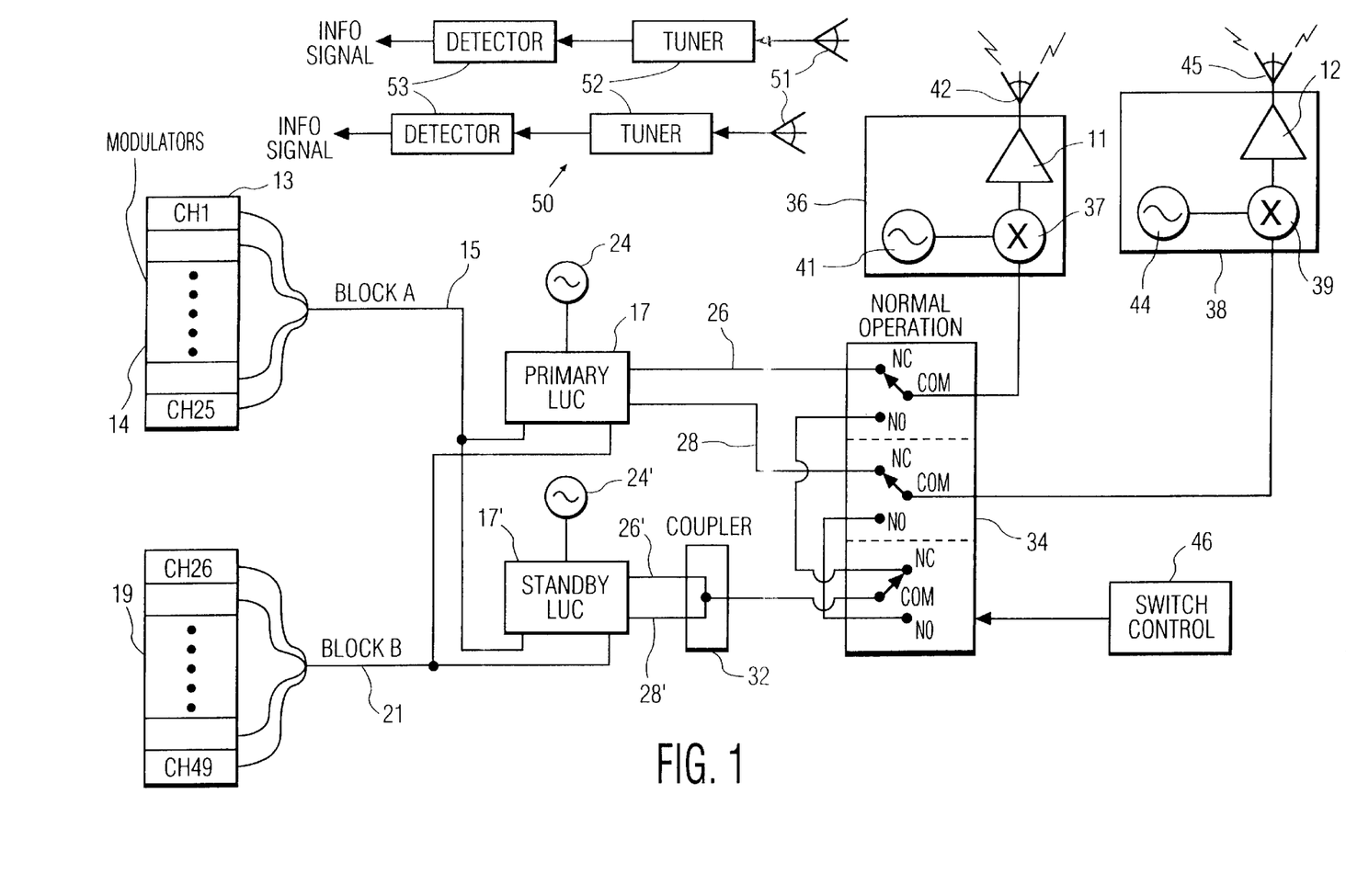
FIG. 1 is a block diagram of a system according to a first embodiment of the invention.
Figure 2:
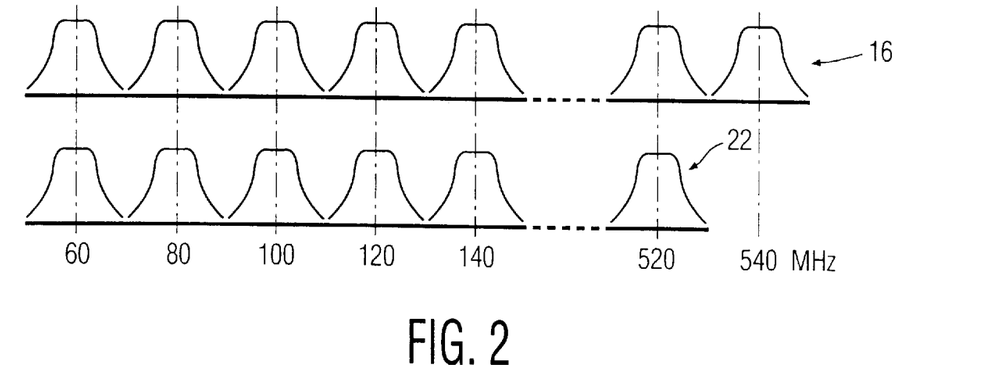
FIG. 2 is a spectrum chart showing the channel inputs to the L-band upconverters of the embodiment of FIG. 1.

According to a first embodiment of the invention, a transmitter unit 10 contains two traveling wave tube amplifiers 11, 12 which respectively transmit nominally 18 MHz-wide channels in the 27.5 to 28.0 GHz band and the 28.0 to 28.5 GHz band, allowing a 2 MHz guard band between adjacent channels. In normal operation the input to amplifier 11 contains information signals CH 1 through CH 25 which in this example are ordinary television signals, but may also be any other broad or narrow band signals, or combinations of signals which are multiplexed for convenience in transmission and are then demultiplexed at the receiving location. Signals CH 1–CH 25 are FM modulated on carrier frequencies of 60, 80, 100 . . . 540 MHz in individual modulators such as 13, together forming a modulator set 14, to form channel block A whose signal 15 is coupled to primary and standby L-band up-converters 17 and 17'. The signal 15 has a combined spectrum shown in idealized form as spectrum 16 in FIG. 2.

Similarly, in normal operation the input to amplifier 12 contains information signals CH 26 through CH 49 which typically are ordinary television signals, but may also be any other broad or narrow band signals or combined signals. These signals are FM modulated on carrier frequencies of 60, 80, 100 . . . 520 MHz in modulator set 19, to form channel block B whose signal 21 is coupled to primary and standby L-band up-converters 17 and 17'. The signal 21 has a combined spectrum shown in idealized form as spectrum 22 in FIG. 2.

Figure 3:
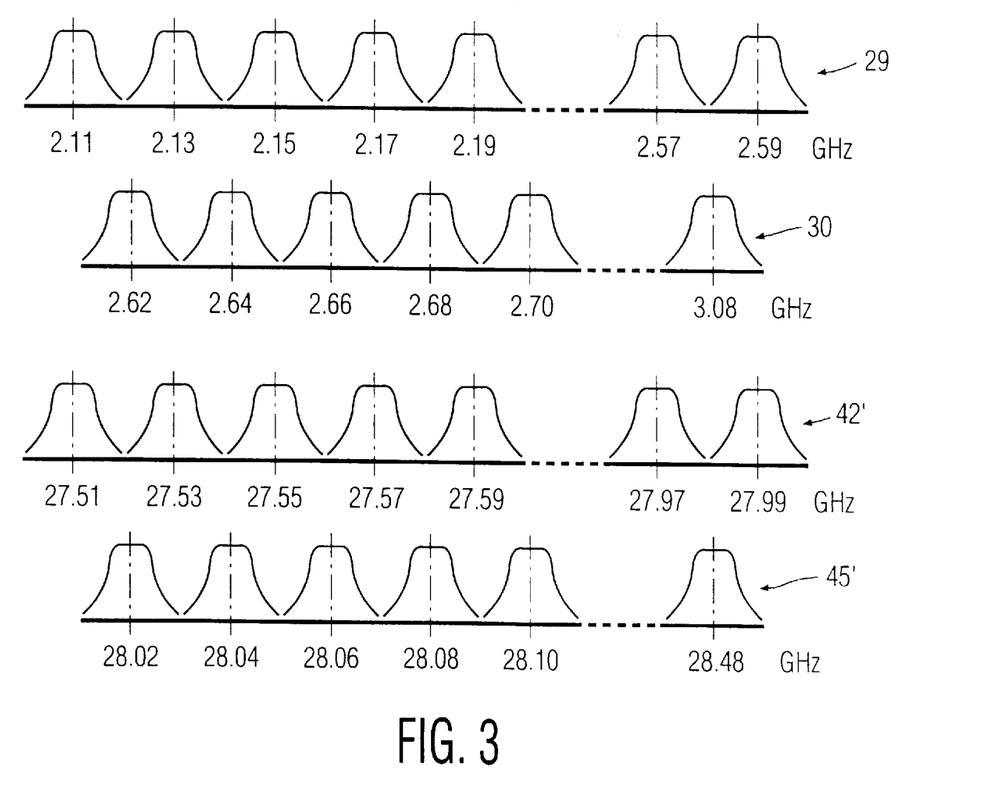
FIG. 3 is a spectrum chart showing the L-band channel outputs and transmitter outputs according to the embodiment of FIG. 1.

The L-band upconverters 17 and 17' are identical. Each has two channels, one for mixing signal 15 with a lower frequency such as 2.050 GHz from the respective one of oscillator sets 24, 24' to provide an L-band output signal 26, 26' between 2.1 GHz and 2.6 GHz, having carrier frequencies centered at frequencies of 2.110 through 2.590 GHz, spaced 20 MHz apart; and the other for mixing signal 21 with an upper frequency such as 2.560 GHz from the respective oscillator set 24, 24' to provide an L-band output signal 28, 28' between 2.61 GHz and 3.09 GHz, having carrier frequencies centered at frequencies of 2.620 through 3.080 GHz, spaced 20 MHz apart. Signal 26 has an idealized spectrum 29, and signal 28 has an idealized spectrum 30, shown in FIG. 3.

In this embodiment, according to the invention of U.S. patent application Ser. No. 08/684,651 referred to above, the L-band signals 26' and 28' are combined in a coupler 32 whose output is one input to a switch 34 which also receives the signals 26 and 28. In normal operation the switch 34 feeds the signal 26 to a mixer 37 of a first transmitting section 36, and the signal 28 to a mixer 39 of a second transmitting section 38. The output of coupler 32 is not used. The transmitting section 36 includes a 25.4 GHz oscillator 41 whose output is the second input to the mixer 37, the mixer output being amplified in the TWTA 11 and provided to a first antenna 42. Similarly, the transmitting section 38 includes a 25.4 GHz oscillator 44 whose output is the second input to the mixer 39, the mixer output being amplified in the TWTA 12 and provided to a second antenna 45. The signal transmitted from antenna 42 has an idealized spectrum 42' having output carrier frequencies at 27.510 through 27.990 GHz, and the signal transmitted from antenna 45 has an idealized spectrum 45' having output carrier frequencies at 28.020 through 28.480 GHz, these spectra being shown in FIG. 3.

In the event that there is a failure of one of the transmitting sections, a switch control 46 operates the switch 34 so as to provide the coupler 32 output to the functioning transmitting section so that all channels are still transmitted. Intermodular distortion products due to the signals in block A will still fall outside the important central areas of the channels forming block B.

In a system according to the invention, signals from either antenna 42 or 45 are picked up by receiving units 50 having respective directional antennae 51, tuners 52, and detectors 53.

With this channel arrangement, intermodular distortion in the lower band amplifier 11 creates undesired signals spaced 20 MHz apart, with some of these lying in the upper band. When the inputs to amplifier 11 are frequency modulated with a video signal, the intermodular distortion products are concentrated in bands a few megahertz wide, and these bands are centered about the same 20 MHz spacings, some of these intermodular products lying in the upper band concentrated about frequencies such as 28.010, 28.030, 28.050, and so on. However, because of the carrier frequency offset of the frequency-modulated signals amplified in amplifier 12, the block B or upper band information is concentrated about frequencies such as 28.020, 28.040, and so on. The receiver detectors' sensitivity to noise is a curve like that of the power density spectrum of the transmitter for the same channel, centered near the carrier frequencies to which they are tuned. As a result, the intermodular distortion products generated in the lower band modulators and amplifiers have little effect on receivers tuned to the upper band channels. Similarly, the intermodular distortion products generated in the upper band modulators and amplifiers have little effect on the lower band channels, because these distortion products tend to fall midway between the lower band carrier frequencies. Applicant believes that a substantial improvement in carrier to interference ratio can be obtained with this embodiment.

Conversion of a system, in which a continuous 20 megahertz spacing was maintained for all channels across the lower and upper bands, to operation according to the first embodiment, is relatively easy because it is necessary merely to shift a local oscillator for one of the bands, such as the upper channels as described, or the lower channels instead of the upper channels, by a convenient and effective amount such as 10 MHz.

In the transmitter embodiment described above, two channels of each first (L-band) upconverter differ from each other: one raises the frequency by 2.05 GHz, and the other raises the frequency by 2.56 GHz. This has the advantage that the two second (millimeter wave band) upconverters are identical, and also that cross-coupling between the two L-band signals is less troublesome. Further, the output can be provided by one broadband amplifier which receives both L-band signals, or more than two amplifiers each covering a respective portion of the total band.

Figure 4:
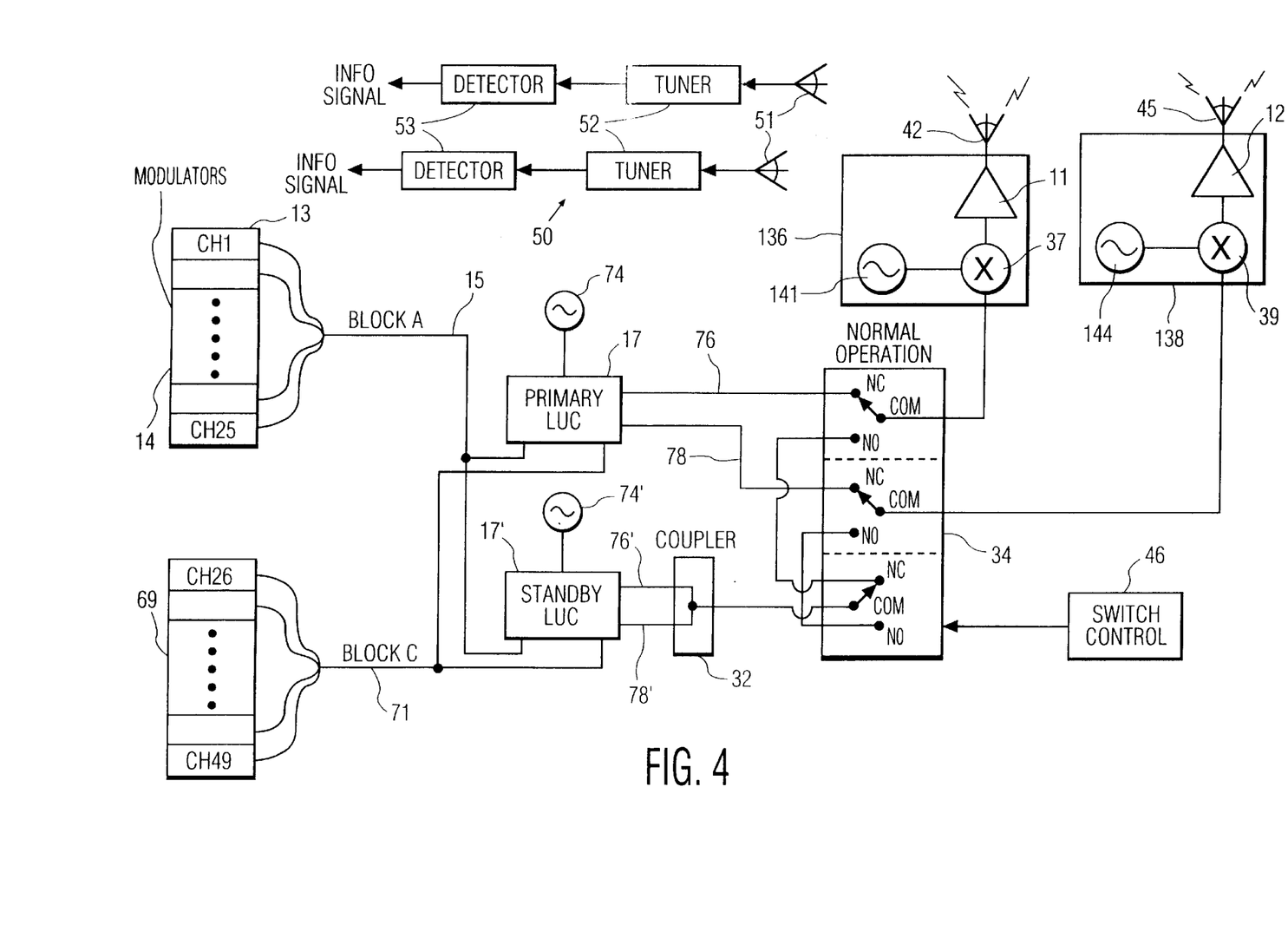
FIG. 4 is a block diagram of a transmitter according to a variation of the first embodiment of the invention.

FIG. 4 shows a variant of the system of FIG. 1, in which these advantages can still be obtained, and in addition effects of cross-coupling between the outputs of the two sets of modulators can be minimized. In this variant, by shifting the set of modulator frequencies in one of the modulator sets so that its channel outputs are offset from the channel outputs of the other modulator set, the local oscillator frequencies in the upconverters can have a simple geometric relationship to each other, thus simplifying the locking of the millimeter wave channel frequencies to the desired relationship to each other.

Elements which can be identical to those of FIG. 1 bear the same reference numeral. As shown in FIG. 4 channel block A and its modulator set 14 are the same as in FIG. 1. However, modulator set 69 produces an FM modulated block C whose signal 71 has carrier frequencies at 70, 90, 110, 130 . . . 530 MHz, frequencies which are offset 10 MHz from, and thus midway between the block A frequencies produced by modulator set 14. If mixed with a local oscillator frequency of 2.0 GHz from oscillator set 74 in the lower channel of first upconverter 17 lower converter, the block A channels 76 occupy a lower L-band of 2.05 to 2.550 GHz, while the block C frequencies are mixed with a local oscillator frequency of 2.5 GHz, which is easily locked to the 2.0 GHz source. This produces L-band block C channels 78 occupying an upper L-band of 2.560 to 3.040 GHz. If these two L-band blocks are added and fed to one millimeter wave upconverter and broadband amplifier, the transmitted channels will have exactly the desired frequency spacing. In the preferred variant shown, the same standby switch 34 is used with two transmitter sets 136 and 138, which are identical to sets 36 and 38 except that the oscillators 141 and 144 have a slightly higher frequency, 25.45 GHz so that the transmitted channels will still occupy the 27.5 to 28.49 GHz band.

Figure 5:
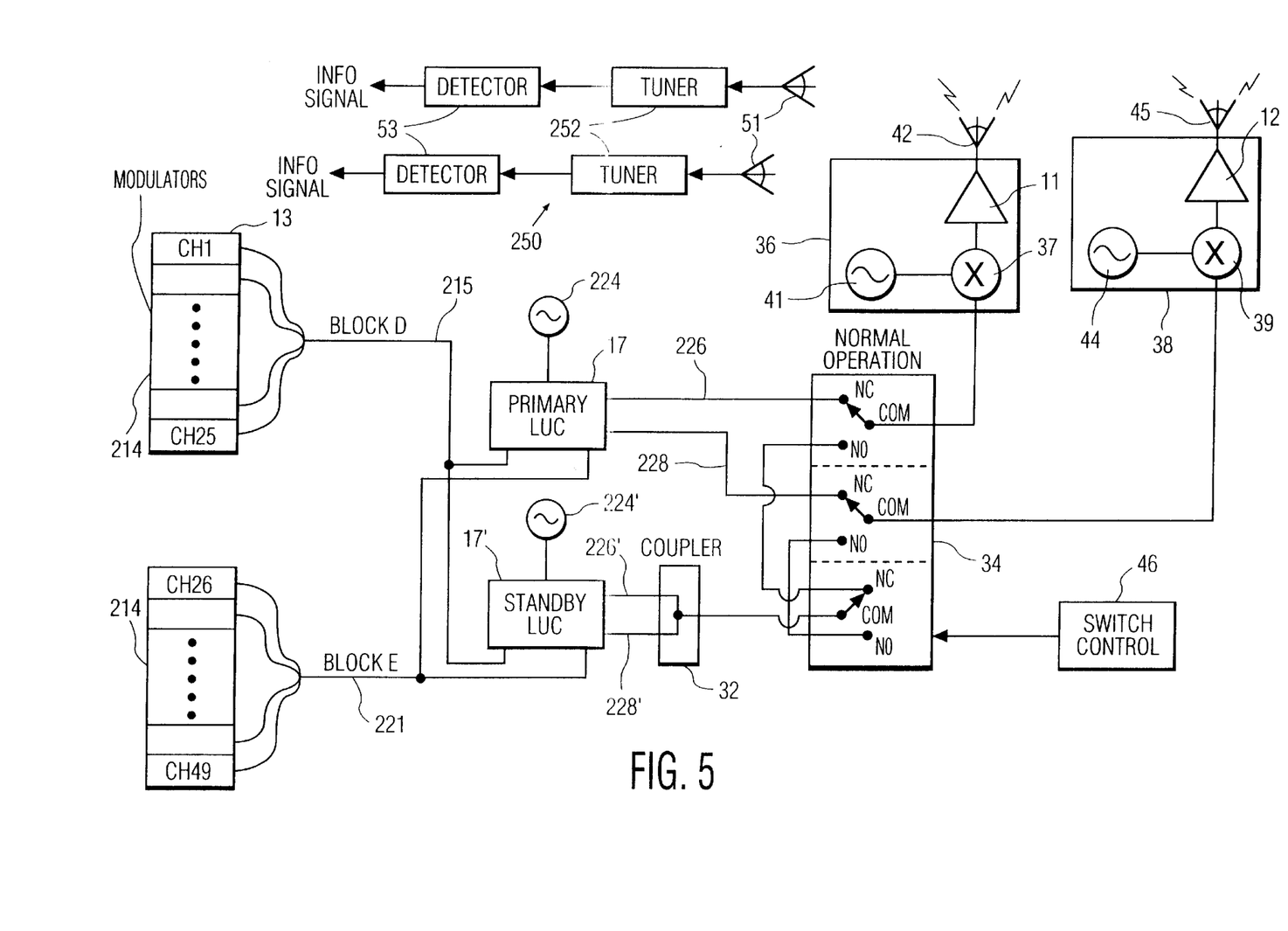
FIG. 5 is a block diagram of a transmitter according to a second embodiment of the invention.

FIG. 5 shows a second embodiment of the invention, in which the spacing of the carrier frequencies in both bands is made non-uniform. This change reduces the intermodular distortion impact on the other channels of the same band portion as the channels being considered as the distortion source, and will provide the same reduction to some but not all of the channels in the other band portion. One criterion that must be considered is the minimum spacing between adjacent channels, which may be established at any arbitrary value depending upon the amount of adjacent channel interference which is tolerable. For example, it may be determined that for a certain set of transmission characteristics, a spacing of 17 MHz is acceptable if the sum of the separations to the channels adjoining on either side equals at least 37 MHz.

In the system of FIG. 5, the modulator sets 214 channels of block D have the same carrier frequencies as those of block E. Unlike the first embodiment, 50 channels are available. The signals 215 of block D and the signals 221 of block E each occupy a band of 50–550 MHz. Oscillator sets 224 and 224' each produce 2.05 and 2.55 GHz signals for the respective channels of the L-band mixers 17 and 17', to produce lower channel group signals 226 and 226' between 2.1 GHz and 2.6 GHz, and upper channel group signals 228, 228' between 2.6 GHz and 3.1 GHz. No other changes are required in the system, except of course that the tuners 252 of the receivers 250 must tune to different transmitted carrier frequencies.

Figure 6:
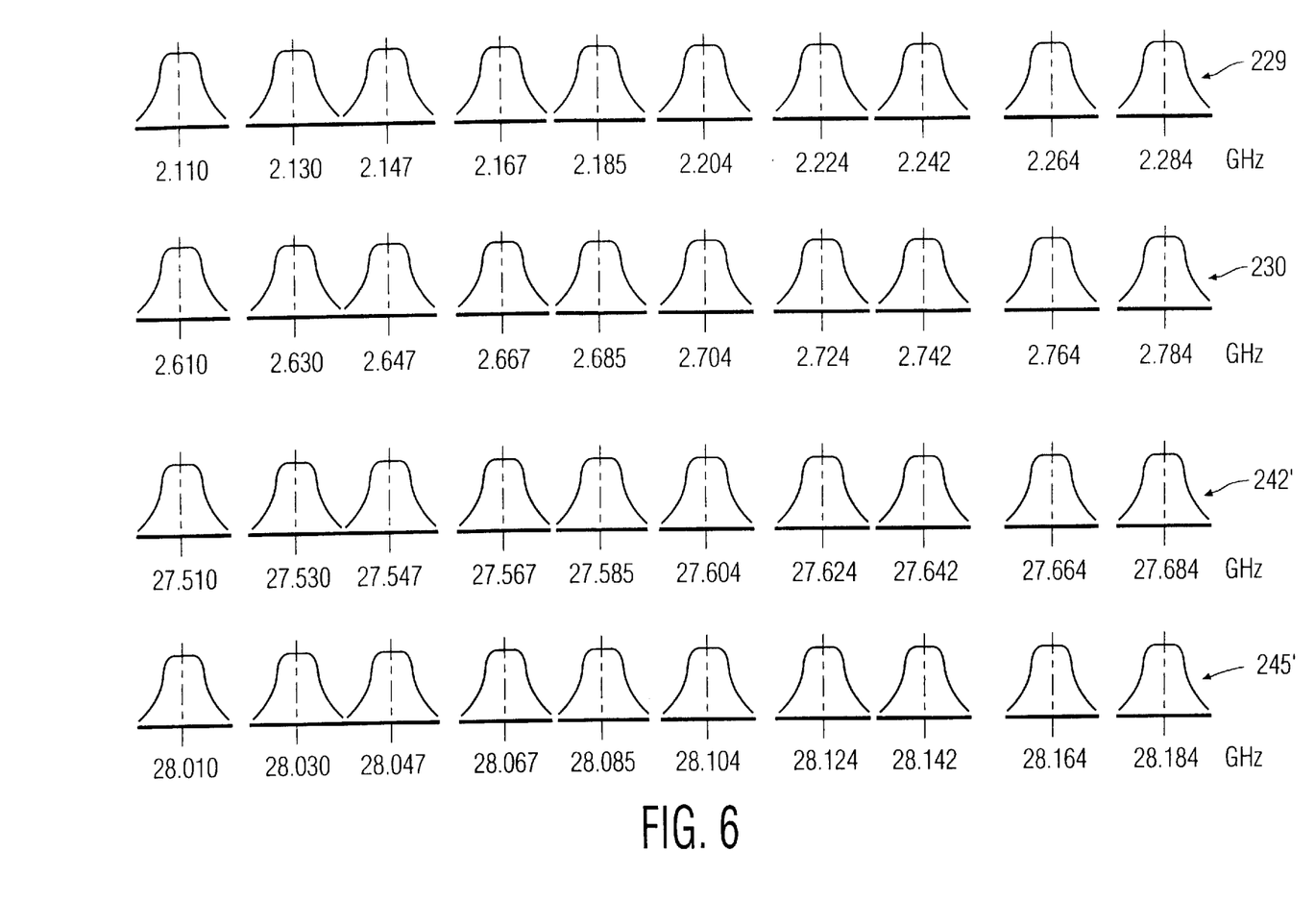
FIG. 6 is a spectrum chart showing the transmitted channels according to the second embodiment.

FIG. 6 shows a spacing sequence of 20, 17, 20, 18, 19, 20, 18. 22, 20 . . . for L-band spectra 229 and 230, and transmitted spectra 242' and 245'. Any desired pattern can be used, either regular or irregular. The average spacing is determined by the number of channels desired to be transmitted, and the allocated spectral band width.

Note that the pattern shown has a concentration of spacings less than 20 MHz, so that the eighth channel carrier is 8 MHz less than it would be with uniform 20 MHz spacing. If this pattern is continued for a few more channels, and is then followed by greater spacings, the deviation of selected ones of the channels from corresponding channels of spectrum 42', which are a 20 MHz multiple from channel 1, can easily reach or exceed 10 MHz. Such a pattern, if repeated for the upper block, may provide deviations of approximately 8 to 10 MHz from the 20 MHz multiple, between some of the upper channels of the lower block and some of the lower channels of the upper block.

Many other variations are possible within the spirit of the invention. The optimum set of spacings between adjacent channels will vary according to the particular transmission parameters, such as the type of information signal in the channel and the modulation type, because these will determine the spacings of the intermodular products which cause the greatest interference. If digital data signals are being transmitted, the type of coding as well as modulation utilized will have a considerable effect on the spectrum produced for each given channel. That in turn will determine what channel spacings are most effective from the point of view of maximizing spectral utilization and reducing noise or interference caused by intermodular distortion in the transmitting sites.

For simplicity in design and construction of the receivers, while still maintaining high spectrum utilization, it is often preferable that all channels have approximately the same bandwidth. The sensitivity of the receiver detector to intermodular interference will, however, be a function of the kind of signal or modulation being transmitted over the channel being received, so that in one system it may be desirable to include both portions having equally spaced channels and portions with unequally spaced channels. The important consideration is that the distortion products tend to lie outside the portions of the other channels which are primarily occupied by the useful information components.

For example, if a total band includes some channels containing solely TV signals; some having some data superimposed on a TV signal, such as by insertion in the vertical retrace blank lines; and some containing a totally different kind of signal, such as multiplexed telephone or data signals, it may be advantageous to transmit one band portion with equally spaced channels, an adjoining band portion with offset equally spaced channels, and a further adjoining band portion with unequally spaced channels. Where a broadband transmitter output stage, such as a TWTA or a broad band solid state amplifier, is used, one amplifier stage can include two or more portions of the band because the individual carrier frequency spacings are determined by the preceding modulator and mixer stages. Further, if broader bandwidth modulators become readily available, a single modulator set can provide all the channels directly to the upconverter. If image frequencies are suppressed by specific filtering, or attenuation due to the cut-off frequency of the antenna waveguide, the final amplifier stage may not be required, and the antenna can be driven directly by the millimeter wave mixer. While a band such as 27.5 to 28.5 GHz has been used as an example in the description, multi-channel transmission is also feasible at lower and higher frequencies, including frequencies which are not usually called millimeter waves, and frequency bands not now used or contemplated for use. Thus, if transmitting narrower or broader channels, or fewer or greater numbers of channels, the invention can be usefully applied at any frequencies where it is feasible and desirable to amplify or otherwise process or affect two or more channels simultaneously via an element which produces intermodular distortion.

What is claimed is:

1. A method of transmitting signals in a band over a multiplicity of channels each including a respective information signal, comprising:

transmitting at least two of said channels via at least one electronic component which produces intermodular distortion from the interaction of the signals of the at least two channels, selecting carrier frequencies for one portion of said multiplicity, where said one portion includes a plurality of said channels and excludes said at least two of said channels, such that interference with detection of the channels of said one portion due to said intermodular distortion will be reduced, and transmitting said one portion of the channels with the selected carrier frequencies.

2. A method as claimed in claim 1, characterized in that the method includes:

transmitting a first portion of said channels including said at least two of said channels, the channels of said first portion being contiguous adjacent channels, with a same given spacing between the respective carrier frequencies of adjacent channels, and transmitting a second portion of said channels, the channels of said second portion being contiguous adjacent channels, with said given spacing between carrier frequencies of adjacent channels, said one portion being said second portion, carrier frequencies of said second portion being different from frequencies which are spaced a multiple of said given spacing from the frequencies of the first portion.

3. A method as claimed in claim 2, characterized in that said at least two of said channels are adjacent channels.

4. A method as claimed in claim 2, characterized in that the information signals in the at least two of said channels include television signals, the carrier frequencies are greater than 12 GHz, said at least one electronic component includes a traveling wave tube amplifier, and the step of transmitting at least two of said channels includes transmitting the at least two of said channels using frequency modulation.

5. A method as claimed in claim 1, characterized in that the method includes transmitting a first portion of said channels via said electronic component, said first portion including said at least two of said channels and a third channel, the channels of said first portion being contiguous adjacent channels having a given average spacing and a given minimum spacing of respective adjacent carrier frequencies, the spacing between the respective carrier frequencies of adjacent channels being varied so as to minimize interference resulting from intermodular distortion.

6. A method as claimed in claim 5, characterized in that the information signals in the at least two of said channels include television signals, the carrier frequencies are greater than 12 GHz, said at least one electronic component includes a traveling wave tube amplifier, and the step of transmitting at least two of said channels includes transmitting the at least two of said channels and the third channel using frequency modulation.

7. A system for transmitting signals from a transmitter site to a plurality of receiving stations over a multiplicity of channels each including a respective information signal, in a band having a given average spacing and a given minimum spacing of respective adjacent carrier frequencies, wherein:

the transmitter site includes a transmitter comprising at least one electronic component which produces intermodular distortion from interaction of signals being acted on simultaneously by said component, at least two of said channels being transmitted via said component, and each receiving station includes a receiver comprising a detector, for tuning to and receiving at least one of said multiplicity of channels and detecting the information signal transmitted in said channel, characterized in that the transmitter further comprises means for defining the carrier frequencies of said at least two of said channels and carrier frequencies of one portion of said multiplicity, where said one portion includes a plurality of said channels and excludes said at least two of said channels, said means defining the respective carrier frequencies of said portion such that, when one of said receivers is tuned to a channel in said one portion, the signal to noise ratio of the information signal detected by the detector of said one of said receivers due to intermodular distortion in the transmitted signals is reduced.

8. A system as claimed in claim 7, characterized in that said means defines the carrier frequencies of a first portion of said channels including said at least two of said channels, said at least two of said channels being adjacent channels, the channels of said first portion being contiguous adjacent channels, to have a given same spacing between the respective carrier frequencies of adjacent channels, and a second portion of said channels, the channels of said second portion being contiguous adjacent channels, with said given spacing between carrier frequencies of adjacent channels, said one portion being said second portion, carrier frequencies of said second portion being different from frequencies which are spaced a multiple of said given spacing from the frequencies of the first portion.

9. A system as claimed in claim 8, characterized in that the information signals in the at least two of said channels are television signals, the carrier frequencies are greater than 12 GHz, and said transmitter includes a first FM modulator unit and a first traveling wave tube amplifier for transmitting said at least two of said channels.

10. A system as claimed in claim 9, characterized in that said first portion and said second portion together include all of said multiplicity of channels, and said first traveling wave tube amplifier transmits said first portion, and said transmitter includes a second traveling wave tube amplifier for transmitting said second portion of said multiplicity of channels.

11. A system as claimed in claim 7, characterized in that said transmitter transmits a first portion of said channels via said electronic component, said first portion including said at least two of said channels and a third channel, the channels of said first portion being contiguous adjacent channels having a given average spacing and a given minimum spacing of respective adjacent carrier frequencies, the spacing between the respective carrier frequencies of adjacent channels being varied so as to minimize interference resulting from intermodular distortion.

12. A system as claimed in claim 11, characterized in that:

the carrier frequencies are greater than 12 GHz, and said at least one electronic component includes a first traveling wave tube amplifier, said first portion and said second portion together include all of said multiplicity of channels, and said first traveling wave tube amplifier transmits said first portion, and the transmitter transmits the at least two of said channels and the third channel using frequency modulation.

13. A system as claimed in claim 12, characterized in that said information signals in the at least two of said channels include television signals, said first portion includes approximately half of said multiplicity of channels, and said first traveling wave tube amplifier transmits said first portion, and said transmitter includes a second traveling wave tube amplifier for transmitting said second portion of said multiplicity of channels.

14. A transmitter for transmitting signals from a transmitter site to at least one receiving station over a multiplicity of channels each including a respective information signal, in a band having a given average spacing and a given minimum spacing of respective adjacent carrier frequencies, wherein the transmitter comprises at least one electronic component which produces intermodular distortion from interaction of signals being acted on simultaneously by said component, at least two of said channels being transmitted via said component, characterized in that:

the transmitter further comprises means for defining the carrier frequencies of said at least two of said channels and carrier frequencies of one portion of said multiplicity, where said one portion includes a plurality of said channels and excludes said at least two of said channels, said means defining the respective carrier frequencies of said one portion such that interfering frequency spectrum components due to said intermodular distortion are reduced.

15. A transmitter as claimed in claim 14, characterized in that said means defines the carrier frequencies of a first portion of said channels including said at least two of said channels, the channels of said first portion being contiguous adjacent channels, to have a given same spacing between the respective carrier frequencies of adjacent channels, and a second portion of said channels, the channels of said second portion being contiguous adjacent channels, with said given spacing between carrier frequencies of adjacent channels, said one portion being said second portion, carrier frequencies of said second portion being different from frequencies which are spaced a multiple of said given spacing from the frequencies of the first portion.

16. A transmitter as claimed in claim 15, characterized in that said at least two of said channels are adjacent channels.

17. A transmitter as claimed in claim 16, characterized in that the carrier frequencies are greater than 12 GHz, and said transmitter includes a first output amplifier which is said at least one electronic component, for transmitting said at least two of said channels.

18. A transmitter as claimed in claim 17, characterized in that said information signals in the at least two of said channels include frequency modulated television signals, and said transmitter includes a second output amplifier for transmitting at least two channels of said second portion of said multiplicity of channels.

19. A transmitter as claimed in claim 16, characterized in that the carrier frequencies are greater than 12 GHz, and said transmitter includes a first traveling wave tube amplifier for transmitting said at least two of said channels.

20. A transmitter as claimed in claim 19, characterized in that said information signals in the at least two of said channels include frequency modulated television signals, said first portion includes approximately half of said multiplicity of channels, and said first traveling wave tube amplifier transmits said first portion, and said transmitter includes a second traveling wave tube amplifier for transmitting said second portion of said multiplicity of channels.

21. A transmitter as claimed in claim 14, characterized in that said transmitter transmits a first portion of said channels via said electronic component, said first portion including said at least two of said channels and a third channel, the channels of said first portion being contiguous adjacent channels having a given average spacing and a given minimum spacing of respective adjacent carrier frequencies, the spacing between the respective carrier frequencies of adjacent channels being varied so as to minimize interference resulting from intermodular distortion.

22. A transmitter as claimed in claim 21, characterized in that the channels of said one portion are contiguous adjacent channels.

23. A transmitter as claimed in claim 22, characterized in that the carrier frequencies are greater than 12 GHz, and said transmitter includes a first output amplifier which is said at least one electronic component, for transmitting said at least two of said channels and said third channel.

24. A transmitter as claimed in claim 23, characterized in that said information signals in the at least two of said channels include frequency modulated television signals, and said transmitter includes a second output amplifier for transmitting at least two channels of said second portion of said multiplicity of channels.

25. A transmitter as claimed in claim 22, characterized in that the carrier frequencies are greater than 12 GHz, and said transmitter includes a first traveling wave tube amplifier for transmitting said at least two of said channels and said third channel.

26. A transmitter as claimed in claim 25, characterized in that said information signals in the at least two of said channels include frequency modulated television signals, said first portion includes approximately half of said multiplicity of channels, and said first traveling wave tube amplifier transmits said first portion, and said transmitter includes a second traveling wave tube amplifier for transmitting said second portion of said multiplicity of channels.

* * * * *